(12) United States Patent
Kawaguchi et al.

(10) Patent No.: US 9,977,183 B2
(45) Date of Patent: May 22, 2018

(54) OPTICAL FIBER AND OPTICAL FIBER TRANSMISSION PATH

(71) Applicant: SUMITOMO ELECTRIC INDUSTRIES, LTD., Osaka-shi, Osaka (JP)

(72) Inventors: Yuki Kawaguchi, Kanagawa (JP); Yoshinori Yamamoto, Kanagawa (JP); Masaaki Hirano, Kanagawa (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days. days.

(21) Appl. No.: 15/414,857

(22) Filed: Jan. 25, 2017

(65) Prior Publication Data

US 2017/0131468 A1 May 11, 2017

Related U.S. Application Data

(63) Continuation of application No. PCT/JP2015/074172, filed on Aug. 27, 2015.

(30) Foreign Application Priority Data

Aug. 28, 2014 (JP) ................................. 2014-174046

(51) Int. Cl.
G02B 6/036 (2006.01)
G02B 6/02 (2006.01)

(52) U.S. Cl.
CPC ..... G02B 6/03627 (2013.01); G02B 6/02019 (2013.01); G02B 6/0365 (2013.01); G02B 6/03611 (2013.01)

(58) Field of Classification Search
CPC ............ G02B 6/03627; G02B 6/02019; G02B 6/0365; G02B 6/03611
See application file for complete search history.

(56) References Cited

U.S. PATENT DOCUMENTS

| | | | | |
|---|---|---|---|---|
| 6,535,678 | B1 * | 3/2003 | Yamauchi | .......... G02B 6/02019 385/123 |
| 2013/0044987 | A1 | 2/2013 | Bickham et al. | |
| 2014/0248026 | A1 * | 9/2014 | Yang | .................. G02B 6/03605 385/127 |

FOREIGN PATENT DOCUMENTS

| | | |
|---|---|---|
| EP | 1 329 750 | 7/2003 |
| JP | 2000-347057 A | 12/2000 |

(Continued)

OTHER PUBLICATIONS

Pierre Sillard et al., "Micro-Bend Losses of Trench-Assisted Single-Mode Fibers," ECOC 2010, Sep. 2010, 3 pages, We.8.F.3.

*Primary Examiner* — Ryan Lepisto
(74) *Attorney, Agent, or Firm* — Drinker Biddle & Reath LLP

(57) ABSTRACT

The present embodiment relates to an optical fiber having a W-type refractive index d profile or a trench-type refractive index profile and having reduced microbending loss in a wavelength band to be actually used. The optical fiber includes a center core, an inner cladding surrounding the center core, and an outer cladding surrounding the inner cladding. The inner cladding has a refractive index lower than a refractive index of at least the center core and the outer cladding has a refractive index lower than the refractive index of the center core and higher than the refractive index of the inner cladding. Wavelength dependency of microbending loss has a local maximal value and a shortest wavelength $\lambda_{th}$ where the microbending loss becomes 10% of the local maximal value is longer than 1560 nm.

11 Claims, 9 Drawing Sheets

(56) References Cited

FOREIGN PATENT DOCUMENTS

JP          2003-262752 A     9/2003
WO    WO 2012149818 A1 * 11/2012   ......... G02B 6/03605

* cited by examiner

Fig.5

| | Δ1 [%] | Δ2 [%] | 2a [μm] | b/a | Aeff at1550nm [μm²] | λcc [nm] | λth [nm] | THEORETICAL CUTOFF WAVELENGTH OF LP02-MODE [nm] | MAXIMUM VALUE OF MICRO-BENDING LOSS [dB/km] | MICRO-BENDING LOSS at1550nm [dB/km] | BENDING LOSS at1550nm (R=10mm) [dB/m] |
|---|---|---|---|---|---|---|---|---|---|---|---|
| SAMPLE 1 | 0.45 | 0.10 | 13.0 | 4.2 | 113 | 1771 | 1575 | 1400 | 0.26 | 0.00 | 0.0 |
| SAMPLE 2 | 0.40 | 0.02 | 12.3 | 5.5 | 110 | 1776 | 1580 | 1250 | 0.22 | 0.01 | 0.0 |
| SAMPLE 3 | 0.36 | 0.02 | 13.6 | 3.5 | 131 | 1821 | 1632 | 1340 | 0.33 | 0.01 | 0.5 |
| SAMPLE 4 | 0.44 | 0.08 | 14.5 | 3.8 | 131 | 1921 | 1730 | 1470 | 0.30 | 0.00 | 0.0 |
| SAMPLE 5 | 0.40 | 0.08 | 14.2 | 3.5 | 130 | 1762 | 1566 | 1430 | 0.36 | 0.00 | 0.0 |
| SAMPLE 6 | 0.40 | 0.18 | 15.0 | 4.2 | 141 | 1909 | 1726 | 1520 | 0.41 | 0.00 | 0.0 |
| SAMPLE 7 | 0.45 | 0.10 | 14.5 | 3.0 | 130 | 1844 | 1651 | 1530 | 0.34 | 0.00 | 0.0 |
| SAMPLE 8 | 0.50 | 0.16 | 13.5 | 3.0 | 114 | 1795 | 1593 | 1500 | 0.25 | 0.00 | 0.0 |
| SAMPLE 9 | 0.38 | 0.11 | 15.5 | 4.0 | 150 | 1900 | 1725 | 1530 | 0.57 | 0.00 | 0.0 |
| SAMPLE 10 | 0.30 | 0.03 | 16.0 | 2.5 | 167 | 1843 | 1655 | 1380 | 0.60 | 0.02 | 2.1 |

Fig.8

| | Δ1 [%] | Δ1' [%] | Δ2 [%] | 2a [μm] | b/a | a/d | Aeff at1550m [μm²] | λcc [nm] | λth [nm] | THEORETICAL CUTOFF WAVELENGTH OF LP02-MODE [nm] | MAXIMUM VALUE OF MICRO-BENDING LOSS [dB/km] | MICRO-BENDING LOSS at1550nm [dB/km] | BENDING LOSS at1550nm (R=10mm) [dB/m] |
|---|---|---|---|---|---|---|---|---|---|---|---|---|---|
| SAMPLE 11 | 0.47 | 0.05 | 0.1 | 12.9 | 4.2 | 3.0 | 115 | 1773 | 1574 | 1403 | 0.24 | 0.00 | 0.0 |
| SAMPLE 12 | 0.47 | 0.16 | 0.02 | 11.7 | 5.5 | 2.5 | 113 | 1775 | 1579 | 1255 | 0.22 | 0.01 | 0.0 |
| SAMPLE 13 | 0.39 | 0.09 | 0.14 | 12.9 | 3.5 | 2.8 | 130 | 1820 | 1630 | 1346 | 0.34 | 0.01 | 0.5 |
| SAMPLE 14 | 0.46 | 0.10 | 0.18 | 13.6 | 3.8 | 3.5 | 132 | 1920 | 1728 | 1471 | 0.30 | 0.00 | 0.0 |
| SAMPLE 15 | 0.41 | 0.01 | 0.04 | 14 | 3.5 | 2.0 | 130 | 1769 | 1568 | 1433 | 0.36 | 0.00 | 0.0 |
| SAMPLE 16 | 0.41 | 0.05 | 0.16 | 14.8 | 4.2 | 4.0 | 144 | 1910 | 1725 | 1521 | 0.47 | 0.00 | 0.0 |
| SAMPLE 17 | 0.50 | 0.13 | 0.10 | 13.2 | 3.0 | 2.8 | 131 | 1842 | 1650 | 1530 | 0.31 | 0.00 | 0.0 |
| SAMPLE 18 | 0.54 | 0.09 | 0.11 | 12.2 | 3.0 | 2.2 | 116 | 1796 | 1593 | 1501 | 0.20 | 0.00 | 0.0 |
| SAMPLE 19 | 0.41 | 0.08 | 0.14 | 14.4 | 4.0 | 3.0 | 153 | 1901 | 1725 | 1530 | 0.51 | 0.00 | 0.0 |
| SAMPLE 20 | 0.33 | 0.10 | 0.12 | 14.6 | 2.5 | 3.2 | 165 | 1845 | 1656 | 1388 | 0.57 | 0.01 | 2.1 |

OPTICAL FIBER AND OPTICAL FIBER TRANSMISSION PATH

CROSS-REFERENCE TO RELATED APPLICATIONS

This application is a continuation application of PCT/JP2015/074172 claiming the benefit of priority of the Japanese Patent Application No. 2014-174046 filed on Aug. 28, 2014, the entire contents of which are incorporated herein by reference.

TECHNICAL FIELD

The present invention relates to an optical fiber and an optical fiber transmission line.

BACKGROUND ART

In an optical communication system, an optical fiber transmission line is used as an optical transmission line to transmit signal light. In addition, in signal light transmission (particularly, digital coherent transmission) in the optical communication system, it is demanded to improve an optical signal-to-noise ratio (OSNR). For this reason, it is required to reduce transmission loss and non-linearity of an optical fiber configuring at least a part of the optical fiber transmission line. To reduce the non-linearity of the optical fiber, it is effective to increase an effective cross-sectional area of the optical fiber. For example, an optical fiber in which an effective cross-sectional area has increased to 110 $\mu m^2$ or more is known.

However, in the optical fiber in which the effective cross-sectional area has increased, confinement of propagation light (fundamental mode light) to a core is weakened. In this case, microbending loss tends to increase. As a result, OSNR may be deteriorated. The microbending loss is the phenomenon that transmission loss increases due to a leak of light in which a fundamental mode of propagation of a core is coupled to a cladding mode and it is known that the cause of the microbending loss is random microbending occurring due to lateral stress application to the optical fiber.

Non Patent Document 1 describes the microbending loss. According to the description of Non Patent Document 1, in a single mode optical fiber having a step-type refractive index profile, the microbending loss exponentially increases with respect to a wavelength. In addition, according to the description of Non Patent Document 1, in an optical fiber having a trench-type refractive index profile, the microbending loss is relatively constant with respect to the wavelength, in a situation where the fundamental mode is coupled to a higher mode to be a leaky mode due to the random microbending. The optical fiber having the trench-type refractive index profile has a core, a first cladding, a second cladding, and a third cladding that are arranged sequentially from a center. A refractive index of the core is higher than refractive indexes of the first cladding and the third cladding and a refractive index of the second cladding is lower than the refractive indexes of the first cladding and the third cladding.

CITATION LIST

Non Patent Literature

Non Patent Document 1: Pierre Sillard, et al., "Micro-Bend Losses of Trench-Assisted Single-Mode Fibers," ECOC2010 We.8.F.3

SUMMARY OF INVENTION

Technical Problem

The inventors have examined the optical fiber according to the related art and have found the following problems as a result thereof. That is, the W-type refractive index profile and the trench-type refractive index profile are known as refractive index profiles of the optical fiber capable of increasing the effective cross-sectional area. The W-type refractive index profile is obtained by configuring each region of the optical fiber by a center core, an inner cladding surrounding the center core and having a refractive index lower than a refractive index of the center core, and an outer cladding surrounding the inner cladding and having a refractive index lower than the refractive index of the center core and higher than the refractive index of the inner cladding. Wavelength dependency of the microbending loss of the optical fiber capable of increasing the effective cross-sectional area is not described in Non Patent Document 1.

The present invention has been made to resolve the problems described above and an object of the present invention is to provide an optical fiber having a W-type refractive index profile or a trench-type refractive index profile and having reduced microbending loss in a wavelength band to be actually used and an optical fiber transmission line including the optical fiber.

Solution to Problem

An optical fiber according to the present embodiment has a W-type refractive index profile or a trench-type refractive index profile and includes a center core and a cladding region surrounding the center core. The cladding region has a depression-type refractive index profile and includes at least an inner cladding surrounding the center core and having a refractive index lower than a refractive index of the center core and an outer cladding surrounding the inner cladding and having a refractive index lower than the refractive index of the center core and higher than the refractive index of the inner cladding. Particularly, the center core, the inner cladding, and the outer cladding are configured such that wavelength dependency of microbending of the optical fiber has a local maximal value and a shortest wavelength $\lambda_{th}$ where the microbending loss becomes 10% of the local maximal value is longer than 1560 nm.

Advantageous Effects of Invention

According to the present embodiment, an optical fiber having a W-type refractive index profile or a trench-type refractive index profile and having reduced microbending loss in a wavelength band to be actually used is obtained.

BRIEF DESCRIPTION OF DRAWINGS

FIG. 5 is a table illustrating configurations and various characteristics of each of samples 1 to 10 according to the present embodiment.

FIG. 8 is a table illustrating configurations and various characteristics of each of samples 11 to 20 according to the present embodiment.

DESCRIPTION OF EMBODIMENTS

Description of Embodiment of Present Invention

Figure 1:
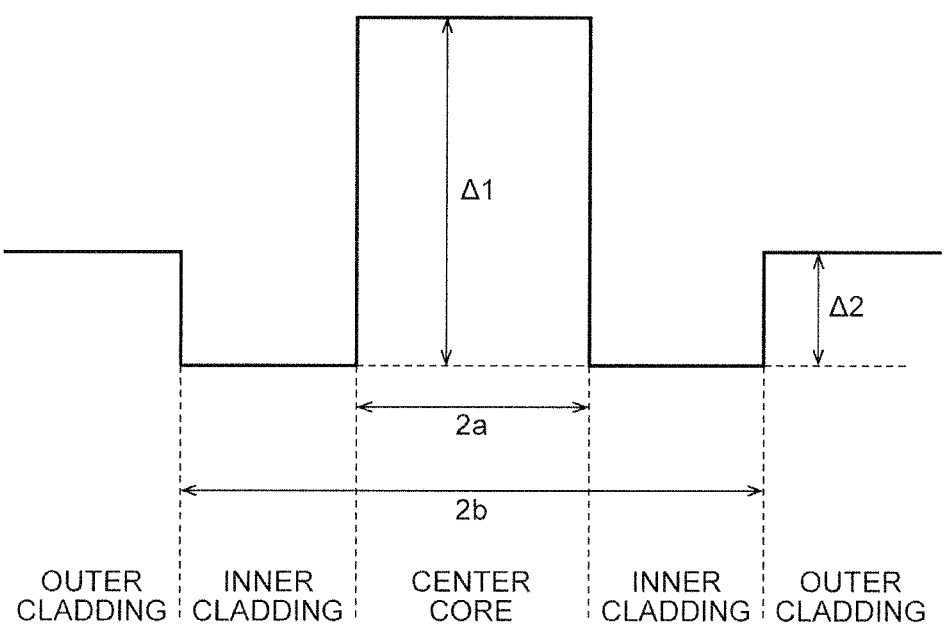
FIG. 1 illustrates a refractive index profile (W-type refractive index profile) of an optical fiber according to the present embodiment.

First, aspects of the present invention will be enumerated and described individually.

(1) An optical fiber according to the present embodiment has a W-type refractive index profile or a trench-type refractive index profile. The refractive index profile is configured from a center core and a cladding region surrounding the center core and having a depression-type refractive index profile. As one aspect of the present embodiment, when the optical fiber has the W-type refractive index profile, the cladding region includes an inner cladding having a refractive index lower than a refractive index of the center core and an outer cladding surrounding the inner cladding and having a refractive index lower than the refractive index of the center core and higher than the refractive index of the inner cladding. In addition, as one aspect of the present embodiment, when the optical fiber has the trench-type refractive index profile, the cladding region may further include a pedestal provided between the center core and the inner cladding, in addition to the inner cladding and the outer cladding. The pedestal has a refractive index lower than the refractive index of the center core and higher than the refractive index of the inner cladding. Even when the optical fiber has any refractive index profile of the W-type refractive index profile and the trench-type refractive index profile, wavelength dependency of microbending loss of the optical fiber has a local maximal value and a shortest wavelength $\lambda_{th}$ where the microbending loss becomes 10% of the local maximal value is longer than 1560 nm.

(2) As one aspect of the present embodiment, a cable cutoff wavelength defined in ITU-T G.650.1 is preferably 1710 nm or more. As one aspect of the present embodiment, the local maximal value of the microbending loss is preferably 0.6 dB/km or less. As one aspect of the present embodiment, an effective cross-sectional area at a wavelength of 1550 nm is preferably 110 μm² or more and 165 μm² or less.

(3) As one aspect of the present embodiment, a diameter 2a of the center core is preferably 12.0 μm or more and 16.0 μm or less, a relative refractive index difference between the inner cladding and the center core is preferably 0.30% or more and 0.55% or less, a ratio b/a of an outer diameter 2b of the inner cladding to the diameter 2a of the center core is preferably 2.5 times or more and 5.5 times or less, and a relative refractive index difference between the inner cladding and the outer cladding is preferably 0.01% or more and 0.20% or less. In the present specification, a relative refractive index difference between a region having a refractive index $n_a$ and a region having a refractive index $n_b$ is defined by an expression: $|n_a^2-n_b^2|/2n_a^2 \times 100(\%)$.

(4) As one aspect of the present embodiment, the center core preferably includes a ring and a depression surrounded by the ring, existing at a center of the center core, and having a refractive index lower than a refractive index of the ring. In addition, as one aspect of the present embodiment, a ratio a/d of the diameter (matched with an outer diameter of the ring) 2a of the center core to a diameter 2d of the depression is preferably 2.0 times or more and 4.0 times or less and a relative refractive index difference between the ring and the depression is preferably 0.02% or more and 0.20% or less.

(5) As one aspect of the present embodiment, in an optical fiber transmission line that includes one or more transmission line elements, each of which has the same structure as a structure of the optical fiber according to the various aspects, signal light of any wavelength in a wavelength band to be actually used is preferably transmitted by the transmission line elements. As one aspect of the present embodiment, the wavelength band to be actually used is preferably one or more continuous wavelength bands in a range of 1520 to 1625 nm. As one aspect of the present embodiment, the wavelength of the signal light is preferably shorter than the wavelength $\lambda_{th}$.

Each aspect enumerated in a section of [Description of embodiment of present invention] can be applied to each of the remaining aspects or all combinations of the remaining aspects.

Details of Embodiment of Present Invention

Hereinafter, a specific structure according to the present embodiment will be described in detail with reference to the accompanying drawings. However, it is intended that the present invention is not limited to the exemplary embodiment and all changes within the scope of the appended claims and their equivalents are included in the present invention.

FIG. 1 illustrates a W-type refractive index profile as a refractive index profile of an optical fiber according to the present embodiment. The optical fiber according to the present embodiment has a center core, an inner cladding surrounding the center core, and an outer cladding surrounding the inner cladding. A refractive index of the inner cladding is lower than a refractive index of the center core. A refractive index of the outer cladding is lower than the refractive index of the center core and is higher than the refractive index of the inner cladding. As illustrated in FIG. 1, a diameter of the center core is set to 2a and an outer diameter of the inner cladding is set to 2b. In addition, a relative refractive index difference between the inner cladding and the center core is set to Δ1 and a relative refractive index difference between the inner cladding and the outer cladding is set to Δ2.

In the optical fiber, a fundamental mode (LP01-mode) may be coupled to a higher mode (particularly, an LP11-mode) or a cladding mode. After the fundamental mode is coupled to the higher mode, the higher mode may be further coupled to the cladding mode. Because coupling from the fundamental mode to higher modes other than the LP11-mode is sufficiently small, only the LP11-mode may be considered as the higher modes.

Microbending loss of the optical fiber is transmission loss due to inter-mode optical coupling and a main cause for the inter-mode optical coupling to occur is random microbending of the optical fiber. A coupling coefficient $C_{1-2}$ between a certain first mode and another second mode is represented by the following expression (1). Here, each of the first mode and the second mode is any one of the fundamental mode (LP01-mode), the higher mode (LP11-mode), and the cladding mode. $\lambda$ is a wavelength. $\beta_1$ is a propagation constant of the first mode. $\Psi_1$ is a field distribution of the first mode. $\beta_2$ is a propagation constant of the second mode. $\Psi_2$ is a field distribution of the second mode. r is a variable representing a distance in a radial direction from a center axis of the optical fiber. $\theta$ is a variable representing a position around the center axis of the optical fiber. K and p are fitting parameters. For example, K=p=2.8 is satisfied.

$$C_{1-2}(\beta) = \frac{K}{\lambda^2 |\beta_1 - \beta_2|^{2p}} \int \int r \cos(\theta) \psi_1 \psi_2 r dr d\theta \quad (1)$$

A coupling coefficient between the fundamental mode (LP01-mode) and the cladding mode is set to $C_{01\text{-}CL}$, a coupling coefficient between the fundamental mode (LP01-mode) and the higher mode (LP11-mode) is set to $C_{01\text{-}11}$, and a coupling coefficient between the higher mode (LP11-mode) and the cladding mode is set to $C_{11\text{-}CL}$. The coupling coefficients $C_{01\text{-}CL}$, $C_{01\text{-}11}$, and $C_{11\text{-}CL}$ are represented by the above expression (1) and are functions of wavelengths. Due to the random microbending of the optical fiber, the fundamental mode of propagation of the optical fiber may become the cladding mode directly and a leak may occur. In addition, the fundamental mode may become the cladding mode via the higher mode and a leak may occur. Therefore, a coupling coefficient $C_{total}$ between the fundamental mode and the cladding mode when coupling from the fundamental mode to the cladding mode directly or indirectly is considered is represented by the following expression (2).

$$C_{total} = C_{01\text{-}CL} + C_{01\text{-}11} C_{11\text{-}CL} \quad (2)$$

Figure 2B:
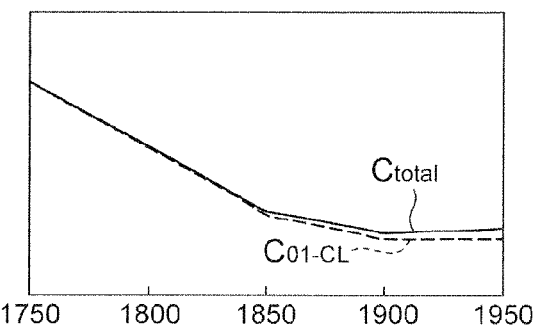
FIGS. 2A and 2B are graphs illustrating an example of wavelength dependency of each of coupling coefficients $C_{01-CL}$, $C_{01-11}$, $C_{11-CL}$, $C_{total}$.
Figure 2A:
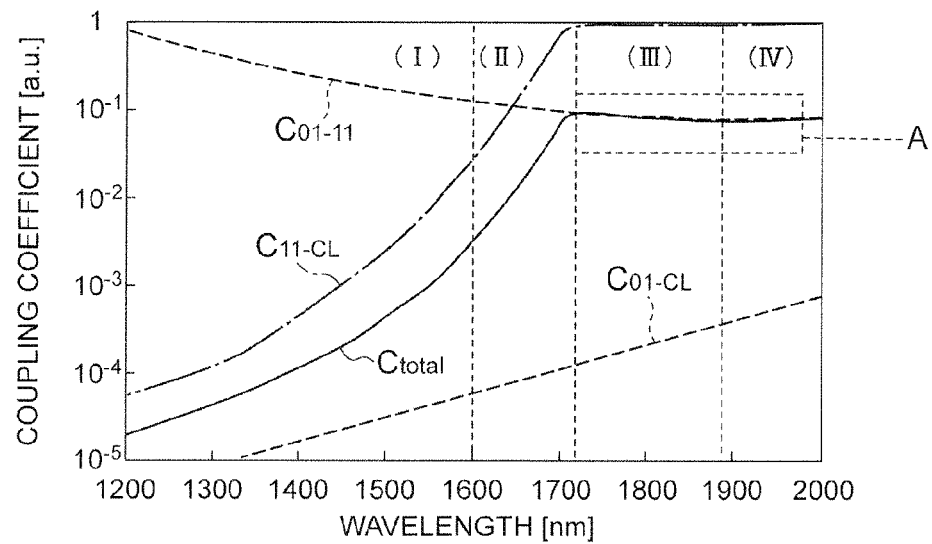

FIGS. 2A and 2B are graphs illustrating an example of wavelength dependency of each of the coupling coefficients $C_{01\text{-}CL}$, $C_{01\text{-}11}$, $C_{11\text{-}CL}$, and $C_{total}$. Particularly, FIG. 2B is an enlarged view of a region A of FIG. 2A. In addition, in FIG. 2A, a wavelength range of 1200 nm to 2000 nm is divided into four wavelength regions (I) to (IV).

In the wavelength region (I) (region of about 1600 nm or less in FIG. 2A), the coupling coefficient $C_{01\text{-}CL}$ between the fundamental mode and the cladding mode is negligibly small and the coupling coefficient $C_{11\text{-}CL}$ between the higher mode and the cladding mode is also small. Therefore, the microbending loss is very small.

In the wavelength region (II) (region of about 1600 nm or more and 1720 nm or less in FIG. 2A), the coupling coefficient $C_{11\text{-}CL}$ between the higher mode and the cladding mode increases rapidly. For this reason, in the wavelength region (II), the microbending loss increases rapidly.

In the wavelength region (III) (region of about 1720 nm or more and 1880 nm or less in FIG. 2A), an effective refractive index of the higher mode is lower than a refractive index of the outer cladding. As a result, all higher modes become cladding modes and a leak occurs. However, because the coupling coefficient $C_{01\text{-}11}$ between the fundamental mode and the higher mode decreases, the microbending loss decreases.

In the wavelength region (IV) (region of about 1880 nm or more in FIG. 2A), the coupling coefficient $C_{01\text{-}CL}$ between the fundamental mode and the cladding mode increases. For this reason, in the wavelength region (IV), the microbending loss increases.

Therefore, the coupling coefficient $C_{total}$ has a local maximal value in the vicinity of a boundary of the wavelength region (II) and the wavelength region (III) and has a minimum value in the vicinity of a boundary of the wavelength region (III) and the wavelength region (IV).

Figure 3:
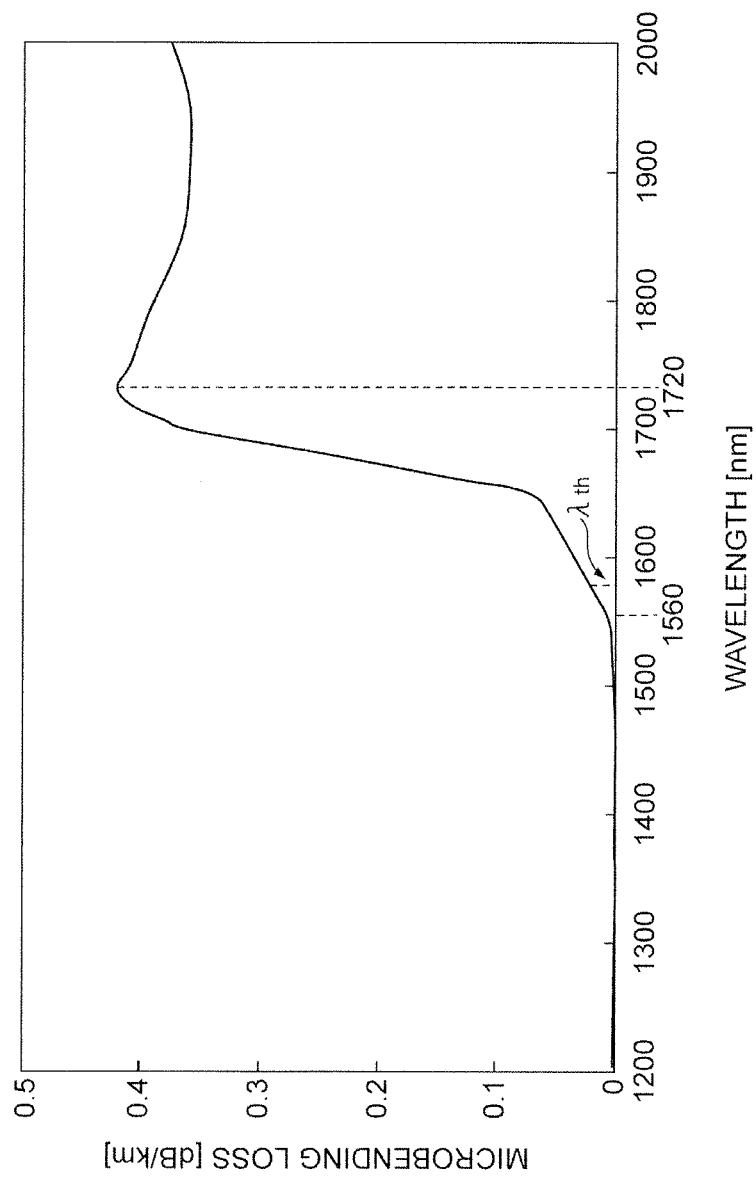
FIG. 3 is a graph illustrating an example of wavelength dependency of microbending loss of the optical fiber.

FIG. 3 is a graph illustrating an example of wavelength dependency of the microbending loss of the optical fiber. As illustrated in FIG. 3, the wavelength dependency of the microbending loss has the same tendency as wavelength dependency of the coupling coefficient $C_{total}$ illustrated in FIGS. 2A and 2B. That is, in the vicinity of the wavelength of 1720 nm, the coupling coefficient $C_{total}$ is maximized (FIGS. 2A and 2B) and the microbending loss is also maximized (FIG. 3). As such, the wavelength dependency of the microbending loss of the optical fiber has a local maximal value. Here, a shortest wavelength where the microbending loss becomes 10% of the local maximal value is set to $\lambda_{th}$.

The microbending loss is measured as follows. A bobbin having a diameter of 400 mm in which a surface is covered at an interval of 100 µm in using wire mesh having a diameter of 50 µm is prepared and the microbending loss is measured as an increase in loss when the optical fiber is wound around the bobbin with tension of 80 g. The microbending loss measured by this measurement method is preferably 1.0 dB/km or less.

As such, the wavelength dependency of the microbending loss depends on coupling between the fundamental mode, the higher mode, and the cladding mode. A wavelength where leak loss of the higher mode increases and propagation is disabled is a cable cutoff wavelength. For this reason, the cable cutoff wavelength is appropriately designed, so that the wavelength $\lambda_{th}$ can be lengthened more than a wavelength band to be actually used, and the microbending loss can be reduced. The wavelength band to be actually used is a wavelength band normally used in optical communication and is a C-band (1530 nm to 1565 nm) or an L-band (1565 nm to 1625 nm), for example. Therefore, in the optical fiber according to the present embodiment, the wavelength $\lambda_{th}$ is longer than 1560 nm.

Figure 4:
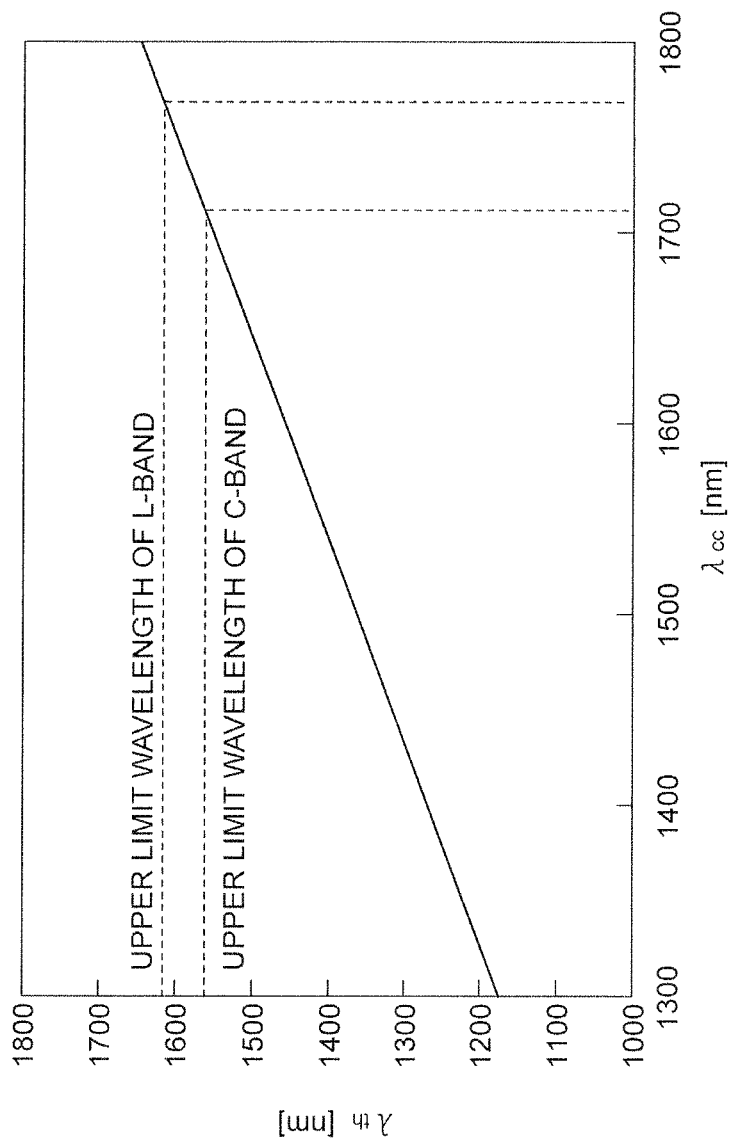
FIG. 4 is a diagram illustrating a relation of a wavelength $\lambda_{th}$ and a cable cutoff wavelength $\lambda_{cc}$.

FIG. 4 is a diagram illustrating a relation of the wavelength $\lambda_{th}$ and the cable cutoff wavelength $\lambda_{cc}$. As known from FIG. 4, to lengthen the wavelength $\lambda_{th}$ more than the wavelength band to be actually used, the cable cutoff wavelength $\lambda_{cc}$ is preferably 1710 nm or more when a use at the C-band is assumed and the cable cutoff wavelength $\lambda_{cc}$ is preferably 1760 nm or more when a use at the L-band is assumed. If $\lambda_{cc}$ is longer than the actual use wavelength, the higher mode may also be confined in the core and may be propagated. However, even if $\lambda_{cc}$ is longer than the actual use wavelength, it is possible to execute a single mode operation substantially.

As known from FIGS. 2A and 2B, it is thought that coupling from the LP01-mode to the LP11-mode is weak, when the local maximal value of the microbending loss decreases. For this reason, the local maximal value of the microbending loss is preferably 0.6 dB/km to execute the single mode operation substantially and suppress an increase in the transmission loss in a state in which a cable is actually laid like a submarine cable or a land cable, even when the cable cutoff wavelength $\lambda_{cc}$ is longer than the actual use wavelength.

In addition, if the cable cutoff wavelength $\lambda_{cc}$ excessively increases, confinement of the higher modes other than the LP11-mode also becomes strong. Similar to the LP01-mode that is the fundamental mode, the LP02-mode of the higher modes has a shape of an electromagnetic field distribution similar to a Gaussian function and the LP01-mode and the LP02-mode are easily coupled. To prevent a signal from being deteriorated due to coupling of the LP01-mode and the LP02-mode, a theoretical cutoff wavelength of the LP02-mode is preferably shorter than the actual use wavelength.

FIG. 5 is a table illustrating configurations and various characteristics of each of samples 1 to 10 of the optical fiber according to the present embodiment. An optical fiber of each of the samples 1 to 10 has the W-type refractive index profile illustrated in FIG. 1. In the table, a relative refractive index difference $\Delta 1$ between an inner cladding and a center core, a relative refractive index difference $\Delta 2$ between the inner cladding and an outer cladding, a diameter 2a of the center core, a ratio b/a of an outer diameter of the inner cladding to the diameter of the center core, an effective cross-sectional area Aeff at a wavelength of 1550 nm, a cable cutoff wavelength $\lambda_{cc}$, a shortest wavelength $\lambda_{th}$ where microbending loss becomes 10% of a local maximal value, a theoretical cutoff wavelength of the LP02-mode, microbending loss at the wavelength of 1550 nm, and bending loss at the wavelength of 1550 nm when a bending radius R is set to 10 mm are sequentially described.

Figure 6:
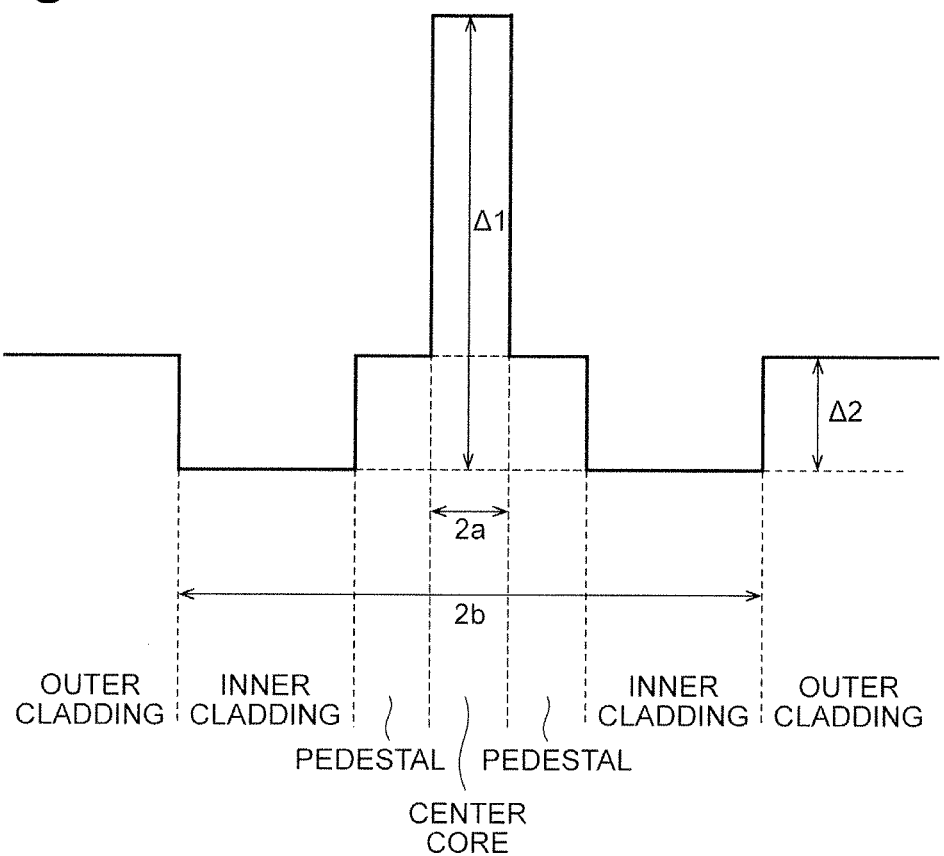
FIG. 6 illustrates a refractive index profile (trench-type refractive index profile) of an optical fiber according to a first modification of the present embodiment.

In addition to the W-type refractive index profile, various refractive index profiles can be applied to the optical fiber according to the present embodiment. For example, FIG. 6 illustrates a refractive index profile (trench-type refractive index profile) of an optical fiber according to a first modification of the present embodiment and the microbending loss can be suppressed more effectively. That is, the optical fiber having the trench-type refractive index profile illustrated in FIG. 6 includes a center core, a pedestal surrounding the center core, an inner cladding surrounding the pedestal, and an outer cladding surrounding the inner cladding. The center core has a diameter 2a and a refractive index thereof is higher than refractive indexes of the pedestal and the outer cladding. In addition, a refractive index of the inner cladding is lower than the refractive indexes of the pedestal and the outer cladding. The refractive indexes of the pedestal and the outer cladding are substantially matched with each other. A relative refractive index difference between the inner cladding and the center core is $\Delta 1$ and both a relative refractive index difference between the inner cladding and the outer cladding and a relative refractive index difference between the inner cladding and the pedestal are $\Delta 2$. Even in the optical fiber having the refractive index profile described above, a shortest wavelength $\lambda_{th}$ where microbending loss becomes 10% of a local maximal value can be set to be longer than 1560 nm.

An effective cross-sectional area Aeff at a wavelength of 1550 nm is preferably 110 μm² or more and 165 μm² or less. In addition, the diameter 2a of the center core is preferably 12.0 μm or more and 16.0 μm or less, the relative refractive index difference $\Delta 1$ between the inner cladding and the center core is preferably 0.30% or more and 0.55% or less, the ratio b/a of the outer diameter of the inner cladding to the diameter of the center core is preferably 2.5 times or more and 5.5 times or less, and the relative refractive index difference $\Delta 2$ between the inner cladding and the outer cladding is preferably 0.01% or more and 0.20% or less.

Figure 7:
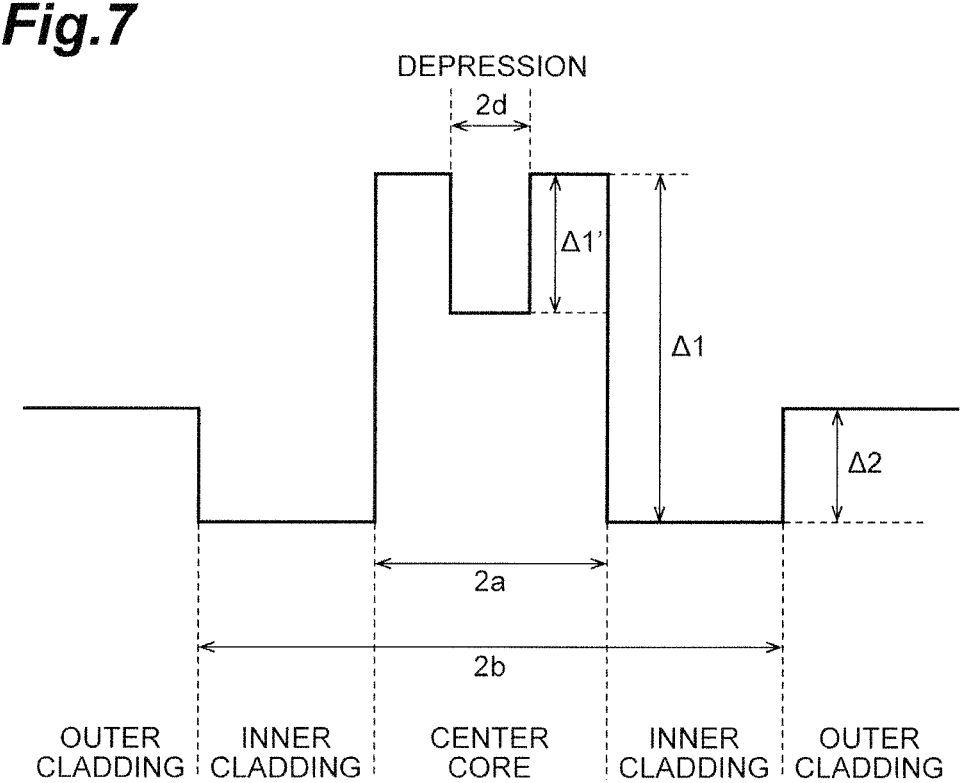
FIG. 7 illustrates a refractive index profile (a modification of the W-type refractive index profile) of an optical fiber according to a second modification of the present embodiment.

FIG. 7 illustrates a refractive index profile (a modification of the W-type refractive index profile) of an optical fiber according to a second modification of the present embodiment. The refractive index profile illustrated in FIG. 7 is different from the refractive index profile illustrated in FIG. 1 in that a center core includes a ring and a depression surrounded by the ring and existing at a center of the center core. A refractive index of the depression is lower than a refractive index of the ring. As illustrated in FIG. 7, a diameter of the depression is set to 2d and a relative refractive index difference between the depression and the ring is set to $\Delta 1'$. Even in the optical fiber having the refractive index profile described above, a shortest wavelength $\lambda_{th}$ where microbending loss becomes 10% of a local maximal value can be set to be longer than 1560 nm. In addition, in the optical fiber having the refractive index profile illustrated in FIG. 7, a mode field diameter MED can be relatively decreased while an effective cross-sectional area Aeff is increased and connection loss with other optical fiber (for example, an optical fiber based on ITU-T G.652) can be reduced.

FIG. 8 is a table illustrating configurations and various characteristics of each of samples 11 to 20 of the optical fiber according to the present embodiment. An optical fiber of each of the samples 11 to 20 has the refractive index profile illustrated in FIG. 7. In the table, a relative refractive index difference $\Delta 1$ between an inner cladding and a core, a relative refractive index difference $\Delta 1'$ between a depression and a ring, a relative refractive index difference $\Delta 2$ between the inner cladding and an outer cladding, a diameter (matched with an outer diameter of the ring) 2a of the center core, a ratio b/a of an outer diameter of the inner cladding to the diameter of the center core, a ratio a/d of the diameter of the center core to a diameter of the depression, an effective cross-sectional area Aeff at a wavelength of 1550 nm, a cable cutoff wavelength $\lambda_{cc}$, a shortest wavelength $\lambda_{th}$ where microbending loss becomes 10% of a local maximal value, a theoretical cutoff wavelength of the LP02-mode, microbending loss at the wavelength of 1550 nm, and bending loss at the wavelength of 1550 nm when a bending radius R is set to 10 mm are sequentially described. The ratio a/d of the diameter of the center core to the diameter of the depression is preferably 2.0 times or more and 4.0 times or less and the relative refractive index difference $\Delta 1'$ between the ring and the depression is preferably 0.02% or more and 0.20% or less.

Figure 9:
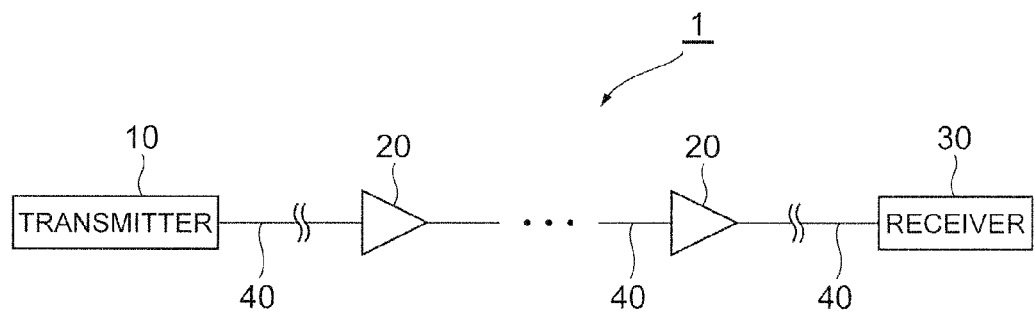
FIG. 9 is a diagram illustrating a configuration of an optical communication system 1 including the optical fiber according to the present embodiment as an optical transmission line.

FIG. 9 is a diagram illustrating a configuration of an optical communication system 1 including the optical fiber according to the present embodiment as an optical transmission line. The optical communication system 1 transmits signal light from a transmitter 10 to a receiver 30 via repeaters 20. The optical fibers 40 according to the present embodiment are laid as optical transmission lines (transmission line elements) to transmit signal light, between the transmitter 10 and the repeater 20 of an initial step, between the certain repeater 20 and the repeater 20 of a next step, and the repeater 20 of a final step and the receiver 30. These transmission line elements may be arranged in parallel.

The refractive index profile illustrated in FIG. 1, 6, or 7 is applied to the optical fiber 40 according to the present embodiment used as the optical transmission line. The optical fiber is configured such that wavelength dependency of the microbending loss has the local maximal value and the shortest wavelength where the microbending loss becomes 10% of the local maximal value is longer than 1560 nm. As a result, the microbending loss in the wavelength band to be actually used can be reduced. Therefore, the optical communication system 1 in which the optical fiber 40 according to the present embodiment is applied as the optical transmission line can perform optical communication in which OSNR is effectively improved.

REFERENCE SIGNS LIST

1 . . . optical communication system, 10 . . . transmitter, 20 . . . repeater, 30 . . . receiver, 40 . . . optical fiber transmission line.

The invention claimed is:

1. An optical fiber comprising:
a center core;
an inner cladding surrounding the center core and having a refractive index lower than a refractive index of the center core; and
an outer cladding surrounding the inner cladding and having a refractive index lower than the refractive index of the center core and higher than the refractive index of the inner cladding,
wherein the center core, the inner cladding, and the outer cladding are configured such that wavelength dependency of microbending loss of the optical fiber has a local maximal value and a shortest wavelength $\lambda_{th}$ where the microbending loss becomes 0.1 times the local maximal value is longer than 1560 nm, and
wherein a relative refractive index difference between the inner cladding and the center core is 0.55% or less.

2. The optical fiber according to claim 1, further comprising a pedestal located between the center core and the inner cladding and having a refractive index lower than the refractive index of the center core and higher than the refractive index of the inner cladding.

3. The optical fiber according, to claim 1,
wherein the optical fiber has a cable cutoff wavelength of 1710 nm or more.

4. The optical fiber according to claim 1,
wherein the local maximal value is 0.6 dB/km or less.

5. The optical fiber according to claim 1,
wherein the optical fiber has an effective cross-sectional area of 110 μm$^2$ or more and 165 μm$^2$ or less at a wavelength of 1550 nm.

6. The optical fiber according to claim 1,
wherein a diameter of the center core is 12.0 μm or more and 16.0 μm or less,
the relative refractive index difference between the inner cladding and the center core is 0.30% or more,
a ratio of an outer diameter of the inner cladding to the diameter of the center core is 2.5 times or more and 5.5 times or less, and
a relative refractive index difference between the inner cladding and the outer cladding is 0.01% or more and 0.20% or less.

7. The optical fiber according to claim 6,
wherein the center core includes a ring and a depression surrounded by the ring, existing at a center of the center core, and having a refractive index lower than a refractive index of the ring.

8. The optical fiber according to claim 7,
wherein a ratio of an outer diameter of the ring to a diameter of the depression is 2.0 times or more and 4.0 times or less, and
a relative refractive index difference between the ring and the depression is 0.02% or more and 0.20% or less.

9. An optical fiber transmission line comprising:
one or more transmission line elements, each of the transmission line elements having the same structure as a structure of the optical fiber according to claim 1,
wherein light of any wavelength in a wavelength band to be actually used is transmitted by the transmission line elements.

10. The optical fiber transmission line according to claim 9,
wherein the wavelength band to be actually used is one or more continuous wavelength bands in a range of 1520 to 1625 nm.

11. The optical fiber transmission line according to claim 10,
wherein the wavelength of the signal light is shorter than $\lambda_{th}$.

* * * * *